United States Patent
Qin et al.

(10) Patent No.: US 9,772,980 B1
(45) Date of Patent: *Sep. 26, 2017

(54) RENDERING CONTENT ON COMPUTING SYSTEMS

(71) Applicant: Google Inc., Mountain View, CA (US)

(72) Inventors: Min Qin, Cupertino, CA (US); Grace Hua Kloba, Sunnyvale, CA (US); Huan Ren, Davis, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/864,534

(22) Filed: Sep. 24, 2015

Related U.S. Application Data (63) Continuation of application No. 13/624,839, filed on Sep. 21, 2012, now Pat. No. 9,171,348.

(60) Provisional application No. 61/589,826, filed on Jan. 23, 2012.

(51) Int. Cl.
  *G06F 17/22* (2006.01)
  *H04N 7/01* (2006.01)
  *G06T 3/40* (2006.01)
  *G06T 11/60* (2006.01)

(52) U.S. Cl.
  CPC ............ *G06F 17/2247* (2013.01); *G06T 3/40* (2013.01); *G06T 11/60* (2013.01); *H04N 7/0122* (2013.01); *G06T 2200/28* (2013.01)

(58) Field of Classification Search
  None
  See application file for complete search history.

(56) References Cited

U.S. PATENT DOCUMENTS

| | | | |
|---|---|---|---|
| 8,250,228 B1* | 8/2012 | Johansson | G06F 9/46 709/231 |
| 2007/0089152 A1 | 4/2007 | Patten et al. | |
| 2007/0143493 A1* | 6/2007 | Mullig | G06F 17/30017 709/232 |
| 2009/0205003 A1 | 8/2009 | Benyamin | |
| 2009/0228919 A1 | 9/2009 | Zott et al. | |
| 2011/0022984 A1* | 1/2011 | van der Meulen | G06F 9/44526 715/830 |
| 2012/0109945 A1 | 5/2012 | Lapko | |
| 2012/0131441 A1* | 5/2012 | Jitkoff | G06Q 30/0641 715/234 |
| 2014/0333633 A1* | 11/2014 | Zhang | G06T 1/20 345/503 |

FOREIGN PATENT DOCUMENTS

WO  WO-0219689 A2  3/2002

* cited by examiner

*Primary Examiner* — Omar S Parra
(74) *Attorney, Agent, or Firm* — McDermott Will & Emery LLP (57) ABSTRACT

A system and method for rendering video content is disclosed. Video content is retrieved from a network and rendered by a graphics processing unit (GPU). The retrieved video content is rendered when a display of the video content is in an application foreground, and stopped when the display of the video content is moved from the application foreground to an application background. The rendering of the video content is then resumed when the display of the video content is returned from the application background to the application foreground.

20 Claims, 7 Drawing Sheets

RENDERING CONTENT ON COMPUTING SYSTEMS

CROSS-REFERENCE TO RELATED APPLICATION

The present application claims the benefit of priority under 35 U.S.C. §120 as a continuation of U.S. patent application Ser. No. 13/624,839, entitled "Rendering Content on Computing Systems," filed on Sep. 21, 2012, which claims the benefit of priority under 35 U.S.C. §119 as a nonprovisional of U.S. Provisional Patent Application Ser. No. 61/589,826, entitled "Rendering Content on Computing Systems," filed on Jan. 23, 2012, the disclosures of which are hereby incorporated by reference in their entirety for all purposes.

FIELD

The subject disclosure generally relates to computing systems, and, in particular, to rendering content on computing systems.

BACKGROUND

A user may view a web page on a computing system (e.g., a smart phone, laptop, etc.). The web page may include text, images, video content (e.g., embedded video) and/or other forms of web content.

SUMMARY

A computer-implemented method for rendering video content is disclosed according to an aspect of the subject technology. The method comprises retrieving video content from a network, directing the retrieved video content to a video hardware accelerator, wherein the video hardware accelerator renders the video content into rendered video content, and determining whether the video content is to be displayed in an embedded mode or a full screen mode. The method also comprises, if the video content is to be displayed in the embedded mode, then instructing a graphics processing unit (GPU) to composite the rendered video content with other rendered content for display to a user on a display, and, if the video content is to be displayed in the full screen mode, then instructing the video hardware accelerator to send the rendered video content to the display without compositing by the GPU.

A system for rendering video content is disclosed according to an aspect of the subject technology. The system comprises one or more processors, a video hardware accelerator, a graphics processing unit (GPU), and a machine-readable medium comprising instructions stored therein, which when executed by the one or more processors, cause the one or more processors to perform operations. The operations comprise retrieving video content from the network, directing the retrieved video content to the video hardware accelerator, wherein the video hardware accelerator renders the video content into rendered video content, and determining whether the video content is to be displayed in an embedded mode or a full screen mode. The operations also comprise, if the video content is to be displayed in the embedded mode, then performing the steps of instructing the video hardware accelerator to write the rendered video content to a memory space in the GPU, and instructing the GPU to composite the rendered video content in the memory space with other rendered content for display to a user on a display. The method further comprises, if the video content is to be displayed in the full screen mode, then instructing the video hardware accelerator to send the rendered video content to the display without compositing by the GPU.

A computer-implemented method for rendering video content is disclosed according to an aspect of the subject technology. The method comprises retrieving video content from a network, and rendering the retrieved video content when a tab associated with the video content is in a foreground. The method also comprises, when the tab is moved from the foreground to a background, stopping the rendering of the video content. The method further comprises, when the tab is moved from the background back to the foreground, resuming the rendering of the video content from a point at which the rendering of the video content stopped.

A machine-readable medium comprising instructions stored therein is disclosed according to an aspect of the subject technology. The instructions, when executed by a machine, cause the machine to perform operations for rendering video content. The operations comprise retrieving video content from a network, and rendering the retrieved video content when a tab associated with the video content is in a foreground. The method comprises, when the tab is moved from the foreground to a background, performing the steps of stopping rendering of the video content, and storing a screenshot of the rendered video content in a memory. The method further comprises, when the tab is moved from the background back to the foreground, displaying the screenshot of the rendered video content.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology quickly and efficiently renders video content in a web page by creating a separate video process on the computing system to handle rendering of the video content. The video process fetches the video content from the network (e.g., the Internet) and feeds the received video content to a video hardware accelerator, which provides fast and high performance rendering of the video content. A graphical process unit (GPU) composites the rendered video content with other rendered web content (e.g., text) for display to the user.

The subject technology also provides systems and methods for conserving power on the computing system.

In one aspect, the user may maximize video content on the display such that the video content occupies the entire display screen (video content is displayed in full screen mode). When this occurs, the video process may instruct the video hardware accelerator to send the rendered video content to the display without compositing by the GPU. The video process may be the same video process used for embedded video (which requires compositing) or a different video process. In this aspect, the GPU does not perform compositing while the video content is displayed in full screen mode, thereby reducing power consumption by the GPU.

In another aspect, a browser on the computing system may allow the user to open multiple tabs to navigate between multiple web pages on the browser. A tab may be in the foreground when the corresponding web page is currently displayed to the user, and a tab may be in the background when the corresponding web page is currently not displayed to the user.

In this aspect, a user may view video content associated with a tab in the foreground. While the tab is in the foreground, the video process may feed the video content to the video hardware accelerator for rendering of the video content. The user may then move the tab to the background by switching to another tab (e.g., to view another web page) or opening a new tab. When this occurs, the video process stops feeding the video content to the video hardware accelerator to stop rendering of the video content. By stopping rendering of the video content when the corresponding tab is moved to the background, the computing system does not waste video resources rendering video content that is not visible to the user, thereby conserving power on the computing system.

When the user moves the tab back to the foreground, the video process may resume feeding the video content to the video hardware accelerator for rendering of the video content. The video process may resume feeding the video content to the video hardware accelerator from the point at which it previously stopped feeding the video content to the video hard accelerator. When the tab is moved back to the foreground, the computing system may automatically resume rendering of the video content or may require the user to activate a play button (e.g., click on the play button) to resume rendering of the video content.

Figure 1:
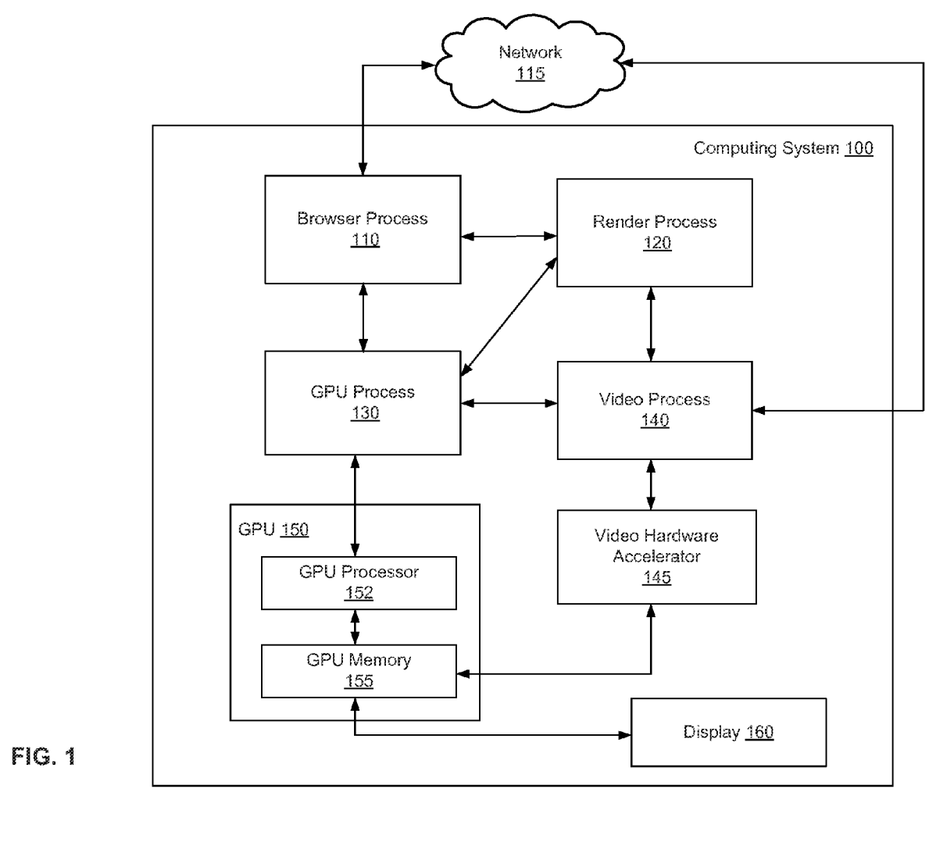
FIG. 1 is a conceptual block diagram of a computing system implementing a multi-process architecture for rendering content according to an aspect of the subject technology.

FIG. 1 shows an example of a computing system 100 comprising multiple processes in a multi-process architecture according to an aspect of the subject technology. The multiple processes may include a browser process 110, a render process 120, a graphics processing unit (GPU) process 130, and a video process 140. The various processes may be implemented on one or more processors and may communicate with one another via inter-process communication (IPC). Although the GPU process 130 is shown separately from the browser process 110, it is to be appreciated that the GPU process 130 may be implemented as a thread in the browser process 110.

The multiple processes increase robustness of a web browser. This is because, if one of the processes crashes, then the crash may be isolated to that process so that the other processes are not affected. In other words, the entire web browser is not brought down when one of the processes crashes (e.g., the render process 120).

In one aspect, the various processes may share data via a shared memory (not shown in FIG. 1). In this aspect, one of the processes may write data to the shared memory and share the data with another process by sending a pointer to the other process indicating where the data is stored in the shared memory. The shared memory may comprise an internal memory of the one or more processors implementing the processes and/or an external memory.

The computing system 100 also comprises a graphics processing unit (GPU) 150 for performing drawing and compositing operations, as discussed further below. The GPU 150 may include a GPU processor 152 and a GPU memory 155. The GPU processor 152 may be configured to provide accelerated compositing of various rendered web content into a composite frame for display on a display 160, as discussed further below. The GPU memory 155 may be used to temporarily store rendered content for compositing and the composite frame.

The computing system 100 also comprises a video hardware accelerator 145 for hardware-accelerated processing (e.g., video decoding) of video content. The video hardware accelerator 145 may support video decoding for various video formats including H.265, VP8, MPEG-4, VC-1 and/or other video formats. An advantage of using the video hardware accelerator 145 for video processing is that the video hardware accelerator 145 can provide higher speed and performance for video processing compared with software running on a general-purpose processor (e.g., a processor on which the processes run). Although the video hardware accelerator 145 is shown separately from the GPU 150 in FIG. 1, it is to be understood that the video hardware accelerator 145 may be part of the GPU 150.

In one aspect, the browser process 110 is configured to manage the browser user interface. The browser process 110 may also be configured to request and receive a web page from a network 115 (e.g., when the user clicks on a link), and send the received web page to the render process 120 for rendering. The web page may include Hyper Text Markup Language (HTML) code or other markup language code describing how various web content (e.g., text, image, video) of the web page are to be rendered and the laid out. The HTML code may also include one or more links (e.g., uniform resource locators (URLs)) to web content for the web page.

The browser process 110 may also determine the position and size of the browser window on the display 160, which may be adjusted by the user (e.g., by clicking a restore down button or maximize button on the browser). The browser process 110 may also determine which portion of the web page is to be displayed within the browser window at a given time, which may be adjusted by the user (e.g., by scrolling the web page within the browser window). The browser process 110 may send this information to the render process 120 as view port information. As discussed further below, the render process 120 may use the view port information to determine where to display rendered web content on the display 160.

In one aspect, the render process 120 may initially receive HTML code for a web page from the browser process 110. The render process 120 may parse and interpret the received HTML code to determine how the various web content of the web page are to be rendered and laid out for display to the user. For example, the render process 120 may utilize WebKit code to parse and interpret the HTML code or other markup language code.

If the HTML code includes one or more links to web content for the web page, then the render process 120 may send the one or more links to the browser process 110, and request that the browser process 110 retrieve the corresponding web content from the network 115. The browser process 110 may retrieve the corresponding web content by sending network requests to the network 115 using the one or more links. Upon receiving the requested web content from the network 115, the browser process 110 may send the web content to the render process 120 for rendering. If the HTML code includes a link to video content, then the render process 120 may instead send the link to the video process 140, which handles rendering of video content, as discussed further below.

The render process 120 may render some of the received web content (e.g., text and images) for the web page using software rendering. For example, the render process 120 may render some of the web content into one or more bitmaps, which may be stored in the shared memory. The render process 120 may also request that the video process 140 render other web content comprising video content based on a client-server model. In this example, the render process 120 acts as a client that requests services (e.g., video rendering) from the video process 140 and the video process 140 acts as a server that provides the requested services (e.g., video rendering), as discussed below.

In one aspect, the HTML code may include a link to video content, which may be displayed with other web content to the user (e.g., a web page with embedded video). In this regard, the HTML code may include a video tag for the video content. The video tag indicates that the web page includes video content and includes a video link (e.g., URL) to the source of the video content on the network 115. The render process 120 may determine that video content needs to be rendered based on the video tag and send the corresponding video link to the video process 140 for rendering of the video content. For each frame of the video content to be rendered, the render process 120 may also send the video process 140 a render target specifying a particular memory space in the GPU memory 155 in which to store the corresponding rendered video frame.

Upon receiving the video link from the render process 120, the video process 140 retrieves the video content from the network 115 using the video link. For example, the video process 140 may send a network request for the video content to the network 115 using the video link. After receiving the requested video content, the video process 140 may send the video content to the video hardware accelerator 145 for hardware-accelerated processing (e.g., video decoding), and instruct the hardware accelerator 145 to write a rendered video frame to a memory space in the GPU memory 155 specified by the render process 120. The video hardware accelerator 145 may store the rendered video frame as a graphics library (GL) texture in the GPU memory 155. The video hardware accelerator notifies the video process 140 when it is finished rendering the video frame, and the video process 140 notifies the render process 120 that the rendered video frame is ready for compositing.

The render process 120 may then instruct the GPU 150 to composite the web content rendered by the render process 120 and the video frame rendered by the video hardware accelerator 145 into a composite frame for display on the display 160. For the web content rendered by the render process 120, the render process 120 may send the GPU process 130 a pointer indicating where the rendered web content is stored in the shared memory. If the web content rendered by the render process 120 corresponds to two or more different layers, then the render process 120 may indicate where the rendered web content for each layer is stored in the shared memory. The render process 120 may also indicate an order in which the rendered web content for the different layers and the rendered video frame are to be composited (e.g., based on the HTML code, which may specify a view hierarchy for the different layers of the web page).

The GPU process 130 may then use the pointer to locate the rendered web content in the shared memory and transfer the rendered web content to the GPU 150. The GPU processor 152 may convert the rendered web content into one or more GL textures and store the one or more GL textures in the GPU memory 155. If the rendered web content corresponds to two or more different layers, then the GPU process may instruct the GPU processor 152 to convert the rendered web content for each layer into a separate GL texture.

For the rendered video frame, the render process 120 may send the GPU process 130 the render target identifying the memory space in the GPU memory 155 holding the GL texture for the rendered video frame. The GPU process 130 may then pass this information to the GPU processor 152 so that the GPU processor 152 can locate the GL texture for the rendered video frame in the GPU memory 155.

The render process 120 may also determine the layout of the web content in the web page (e.g., based on the corresponding HTML code) and where the web page is to be displayed on the display 160 (e.g., based on the view port information from the browser process 110), and send this information to the GPU process 130. Based on the received information, the GPU process 130 may issue commands (e.g., GL commands) to the GPU processor 152 specifying where to draw the GL textures for the rendered web content and the rendered video frame in the composite frame.

The GPU processor 152 may then build the composite frame in a display frame buffer. The display frame buffer may be a memory space allocated in the GPU memory 155 for the composite frame. To do this, the GPU processor 152 may write the GL textures for the rendered web content and the rendered video frame to the display frame buffer one at a time according to the commands from the GPU process 130. When the composite frame is completed in the display frame buffer, the composite frame may be outputted to the display 160 for display to the user.

In one aspect, the render process 120 may instruct the GPU process 130 with the order in which different layers of the web page are to be stacked in the composite frame (e.g., based on the HTML code, which may specify a view hierarchy for the different layers of the web page). In this example, the rendered web content and the rendered video frame may correspond to different layers. According to the received instructions, the GPU process 150 may then send commands to the GPU processor 152 specifying the order in which to write the GL textures for the rendered web content and the rendered video frame to the display frame buffer. For example, the GPU processor 152 may write the GL textures in ascending order starting with the GL texture corresponding to the bottommost layer and ending with the GL texture corresponding to the uppermost layer. Two GL textures may overlap with each other. In this case, the GL texture corresponding to the upper layer is drawn on top of the GL texture corresponding to the bottom layer.

In one aspect, the render process 120 may also instruct the GPU process 130 where the rendered web content and rendered video frame are to be displayed on the display 160 (e.g., based on the view port information from the browser process 110). According to the received instructions, the GPU process 130 may send commands to the GPU 150 specifying where to write the GL textures for the rendered web content and the rendered video frame in the display frame buffer. The resulting composite frame may correspond to the portion of the display 160 in which the browser window is displayed. The composite frame may be further composited with other textures (e.g., texture corresponding to the browser tool bar, texture corresponding to a view of another application running on the computer system, etc.) by a compositor to form the entire frame to be displayed on the display 160 to the user.

The subject technology quickly and efficiently renders video content in a web page by creating a separate video process to handle rendering of the video content. The video process fetches the corresponding video content from the network and feeds the received video data to the video hardware accelerator 145, which provides fast and high performance video processing relative to a general-purpose processor. In addition, the video hardware accelerator 145 may write the rendered video data directly to the GPU memory 155, which is readily accessible by the GPU processor 152 for accelerated compositing of the rendered video data with the rest of the rendered web content into a composite frame for display to the user.

In one aspect, the render process 120 may be sandboxed, in which the render process 120 is restricted by a restriction policy mechanism from accessing certain system resources. For example, the render process 120 may be restricted from direct access to a network interface for communicating with the network 115. As a result, the render process 120 may be unable to directly retrieve content from the network 115 and may rely on another process (e.g., the browser process 110) to retrieve web content on its behalf. The render process 120 may also be restricted from directly accessing the GPU 150, directly accessing sensitive files, and/or other system resources. Sandboxing the render process 120 enhances security by preventing malicious code or un-trusted code in a web page from accessing the restricted resources.

In one aspect, the browser process 110 may send a cookie to the render process 120 indentifying the browser session used by the browser process 110 to request web content from the network 115. The render process 120 may then send the cookie to the video process 140 along with the video link to the video content. When the video process 140 requests the video content from the server hosting the video content, the video process 140 may also send the cookie to the server. The cookie allows the server to treat the request for the video content as from the same session requesting the web content, and to serve the video content properly.

In one aspect, when the video hardware accelerator 140 finishes rendering a video frame, the video process 140 may inform the GPU process 130 directly that the video frame is ready for compositing. In this aspect, the render process 120 may instruct the GPU process 130 to perform the compositing operation when the video process 140 indicates that the video frame is ready.

Figure 2:
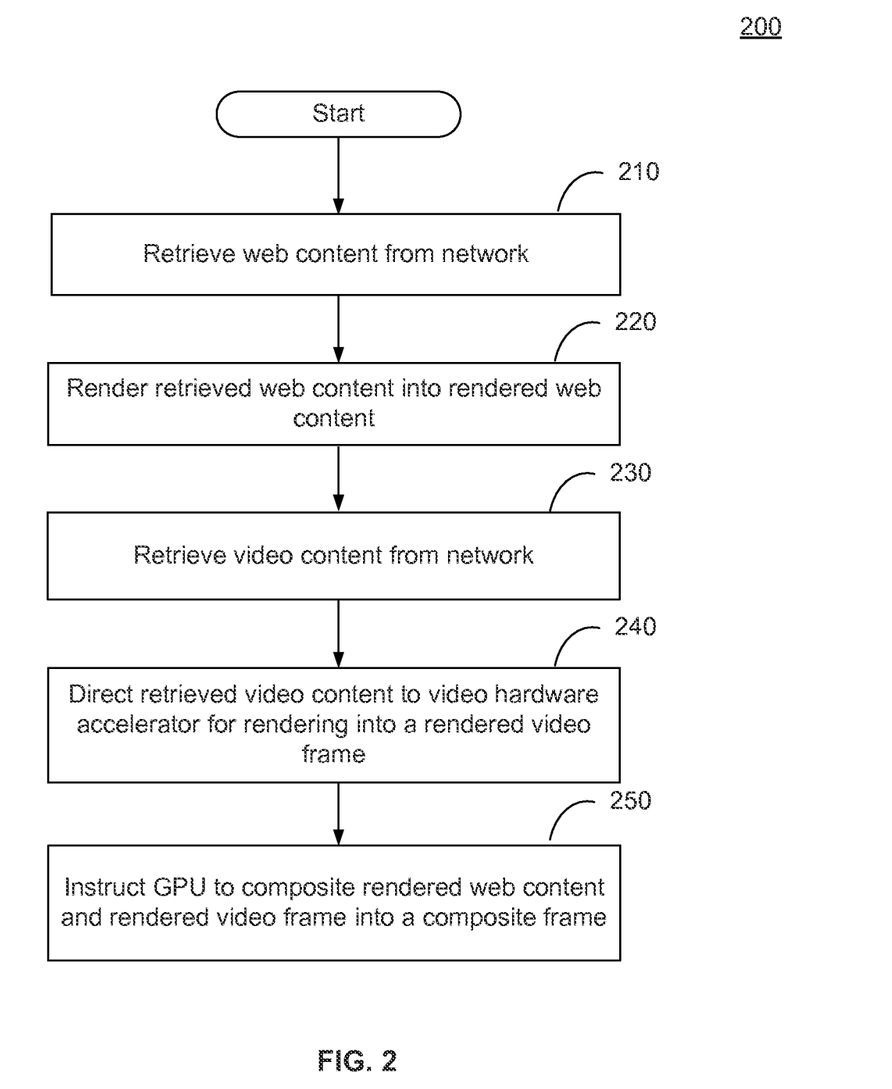
FIG. 2 shows a method for rendering content according to an aspect of the subject technology.

FIG. 2 shows a method 200 for rendering content according to an aspect of the subject technology. The method 200 may be performed by the browser process 110, the render process 120, the video process 140 and the GPU process 130, all of which may be implemented on one or more processors.

In step 210, web content is retrieved from the network 115. For example, the browser process 110 may retrieve the web content by sending one or more network requests for web content to the network 115 and receiving the requested web content from the network 115.

In step 220, the retrieved web content is rendered into rendered web content. For example, the render process 120 may receive the retrieved web content from the browser process 110 and render the retrieved web content (e.g., using software-based renderer). The render process 120 may render the web content into a bitmap or other format, and store the rendered web content in the shared memory.

In step 230, video content is retrieved from the network 115. For example, the render process 120 may parse HTML code to retrieve a link (e.g., URL) to video content and send the retrieved link to the video process 140. The video process 140 may then retrieve the video content from the network 115 using the video link.

In step 240, the retrieved video content is directed to the video hardware accelerator 145 for video rendering. For example, the video process 140 may direct the retrieved video content to the video hardware accelerator 145, which performs video processing (e.g., video decoding) on the video content. The video hardware accelerator 145 may store the resulting rendered video frame in a memory space in the GPU memory 155.

In step 250, the GPU 150 is instructed to composite the rendered web content and the rendered video frame into a composite frame. For example, the GPU process 130 may transfer the rendered web content from the shared memory to the GPU 150 and instruct the GPU 150 to composite the transferred rendered web content and the rendered video frame stored in the GPU memory 155.

In one aspect, the video content may comprise a video data stream that is directed to the video hardware accelerator 145 by the video process 140 for rendering. The video hardware accelerator 145 may render the video data stream into a sequence of rendered video frames. For each rendered video frame, the video hardware accelerator 145 may notify the video process 140 when the rendered video frame is finished. The video process 140 may then notify the render process 120, which may then instruct the GPU process 130 to command the GPU 150 to composite the rendered video frame with the rest of the rendered web content. If the rendered web content does not change between video frames, then, for each new rendered video frame, the render process 120 may instruct the GPU process 130 to command the GPU 150 to composite the rendered web content already stored in the GPU 150 with the new rendered video frame.

For each rendered video frame, the video process 140 may instruct the video hardware accelerator 145 where to store the rendered video frame in the GPU memory 155. For example, two or more different memory spaces may be allocated in the GPU memory 155 for storing rendered video frames and each of the memory spaces may be identified by a unique identifier.

For each rendered video frame, the render process 120 may indicate to the video process 140 in which of the memory spaces the rendered video frame is to be stored using the corresponding identifier. The video process 140 may then communicate this information to the video hardware accelerator 145 so that the rendered video frame is stored in the appropriate memory space. When the rendered video frame is finished, the render process 120 may communicate the identity of the memory space to the GPU process 130 and instruct the GPU process 130 to command the GPU processor 152 to composite the rendered video frame in the identified memory space with the other rendered web content into a composite frame. Thus, the render processor 140 may instruct the GPU process 130 to command the GPU 150 to update the composite frame each time a new video frame becomes available (e.g., at a rate of 30 frames per second or other rate).

In one aspect, the video process 140 may keep track of a current playback position of the video content. The video process 140 may periodically inform the render process 120 of the playback position of the video content (e.g., one or more times a second). In this aspect, the render process 120 may render a video progress bar in a web page indicating the playback position of the video content to the user. Each time the render process 120 receives an update of the playback position of the video content, the render process 120 may update the rendering of the progress bar accordingly.

In one aspect, the user may maximize video content on the display such that the video content occupies the entire display screen (video content is displayed in full screen mode). When this occurs, the video process 140 may instruct the video hardware accelerator 145 to send rendered video content to the display without compositing by the GPU 150. The video process may be the same video process used for embedded video (which requires compositing) or a different video process. In this aspect, the GPU 150 does not perform compositing while the video is in the full screen mode, thereby reducing power consumption by the GPU 150.

Figure 3:
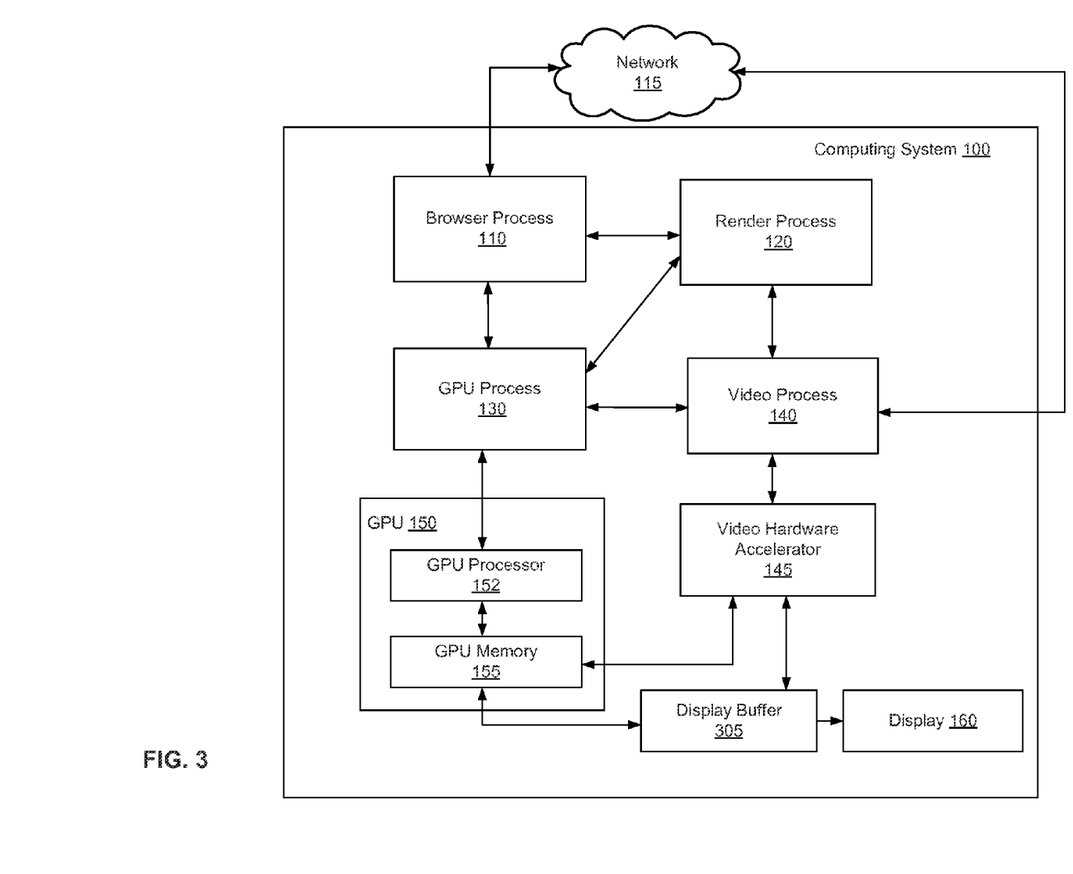
FIG. 3 is a conceptual block diagram of a computing system for rendering content according to another aspect of the subject technology.

FIG. 3 shows an example of a display buffer 305 used to temporarily store a frame for output to the display 160. When the video content is displayed in embedded mode (e.g., video is embedded in a web page), the GPU 150 may send a composite frame from the GPU memory 155 to the display buffer 305 for output to the display 160. Alternatively, the GPU 150 may draw the composite frame directly into the display buffer 305 by separately writing the web content rendered by the render process and the rendered video content into the display buffer to form the composite frame. Although the display buffer 305 is shown as being separate from the GPU memory 155, it is to be understood that the display buffer 305 may comprise a memory space in the GPU memory 155.

When the video content is displayed in embedded mode, the video hardware accelerator 145 may write a rendered video frame to a memory space in the GPU memory 155 that is accessible by the GPU processor 152. This allows the GPU processor 152 to composite the rendered video frame with the rest of the rendered web content to form a composite frame, as discussed above.

The user may switch the video content to the full screen mode (e.g., by clicking on a maximize button on a video media player). When this occurs, the browser process 110 may inform the render process 120 that the video content is to be displayed in the full screen mode. The render process 120 may then instruct the video process 140 to render the video content in full screen mode. The same video process may used for both embedded video and full screen video. Alternatively, another video process may be used for rendering full screen video. In this case, the computing system 100 may have two video processes, in which one video process is used for rendering embedded video and the other video process is used for rendering full screen video.

In the full screen mode, the video process 140 may direct the video content (e.g., video stream) to the video hardware accelerator 145 and instruct the video hardware accelerator 145 to directly write each rendered video frame to the display buffer 305. When each rendered video frame is finished, the video hardware accelerator 145 may trigger the display buffer 305 to output the rendered video frame to the display 160 for display to the user. The video hardware accelerator 145 may render a video frame at a frame rate of 30 frames per second or other frame rate.

In the full screen mode, the render process 120 may cease sending instructions to the GPU process 130 to perform compositing. As a result, the GPU 150 stops compositing rendered video content with web content rendered by the render process. Because the GPU 150 does not perform compositing in the full screen mode, power consumption by the GPU 150 is reduced in the full screen mode.

The user may exit the full screen mode (e.g., by pressing an "esc" key). When this occurs, the browser process 110 may inform the render process 120 that the video content is to be displayed in embedded mode. The render process 120 may then instruct the video process 140 to render video content in the embedded mode. As discussed above, the same video process may be used for both embedded video and full screen video or different video processes may be used. In the embedded mode, the video process 140 may instruct the video hardware accelerator 145 to write each rendered video frame to a memory space in the GPU memory 155 that is accessible by the GPU processor 152 for compositing.

The render process 120 may also render web content and instruct the GPU process 130 to command the GPU 150 to composite each rendered video frame with web content rendered by the render process into a composite frame, as discussed above. Thus, when the user exits the full screen mode, the render process 120 instructs the GPU process 130 to resume compositing the rendered video content with web content rendered by the render process.

In one aspect, when the user exits the full screen mode, the video process 140 may send the current playback position of the video content to the render process 120. The render process 120 may then render a video progress bar in a web page according to the current playback position. The render process may then instruct the GPU process 130 to command the GPU 150 to composite the rendered video progress bar, along with other content rendered by the render process, with the rendered video content.

Figure 4:
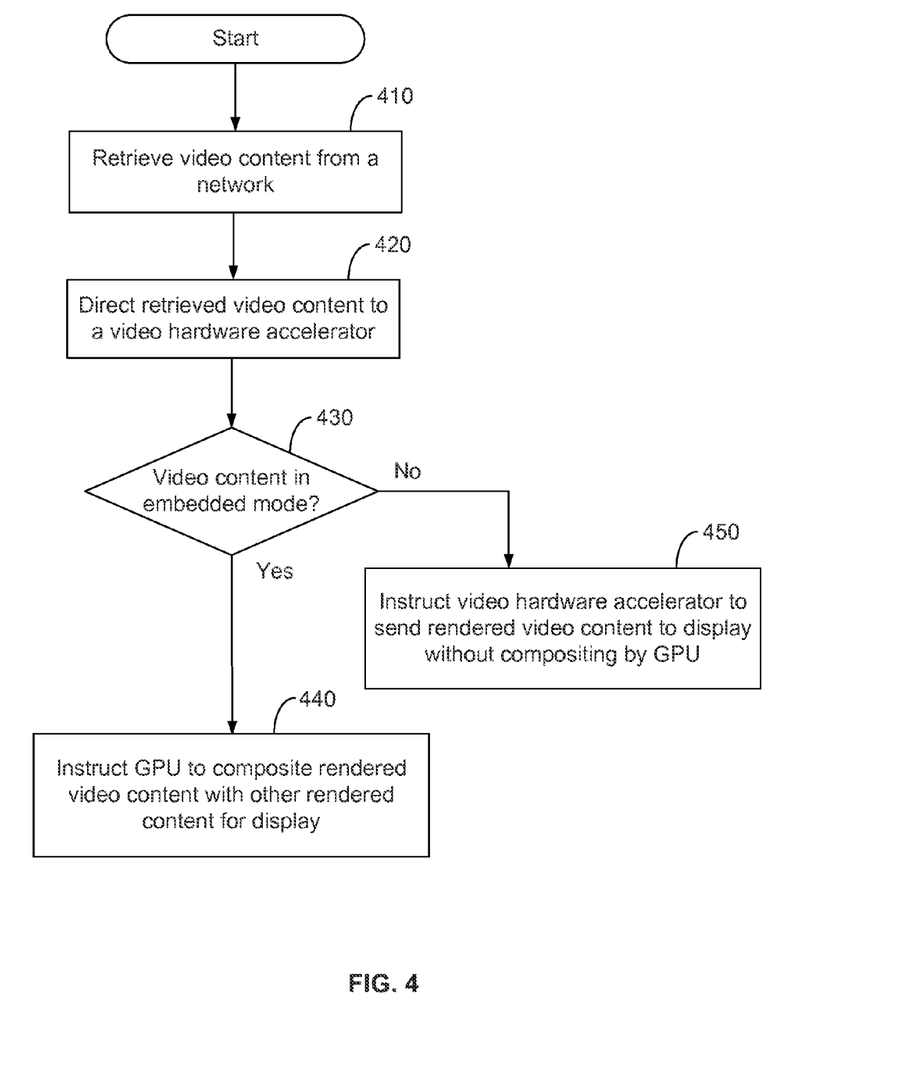
FIG. 4 shows a method for rendering video content according to another aspect of the subject technology.

FIG. 4 shows a method for rendering video content according to an aspect of the subject technology. The method may be performed by the render process 120, the video process 140, and the GPU process 130.

In step 410, video content is retrieved from a network. For example, the video process 140 may retrieve the video content from the network 115 using a video link (e.g., URL) provided by the render process 120, as discussed above.

In step 420, the retrieved video content is directed to a video hardware accelerator. For example, the video process 140 may direct the retrieved video content to the video hardware accelerator 145 for accelerated rendering of the video content, as discussed above.

In step 430, a determination is made whether the video content is to be displayed in embedded mode. If the video content is to be displayed in embedded mode, then the method proceeds to step 440. If the video content is not to be displayed in embedded mode (i.e., video content is to be displayed in full screen mode), then the method proceeds to step 450.

In step 440, a GPU is instructed to composite rendered video content from the video hardware accelerator with other rendered content for display. For example, the GPU process 130 may instruct the GPU 150 to composite a rendered video frame with web content rendered by the render process 120 into a composite frame for display to the user. In this case, the video hardware accelerator 145 may store the rendered video frame in a memory space in the GPU memory 155 that is accessibly by the GPU processor 152 for the compositing.

In step 450, the video hardware accelerator is instructed to send rendered video content to a display without compositing by the GPU. For example, the video process 140 may instruct the video hardware accelerator 145 to send rendered video content to the display 160 for display to the user without compositing by the GPU 150. In this case, the rendered video content may bypass the GPU 150 and be written directly to the display buffer 305 for display to the user.

Figure 5:
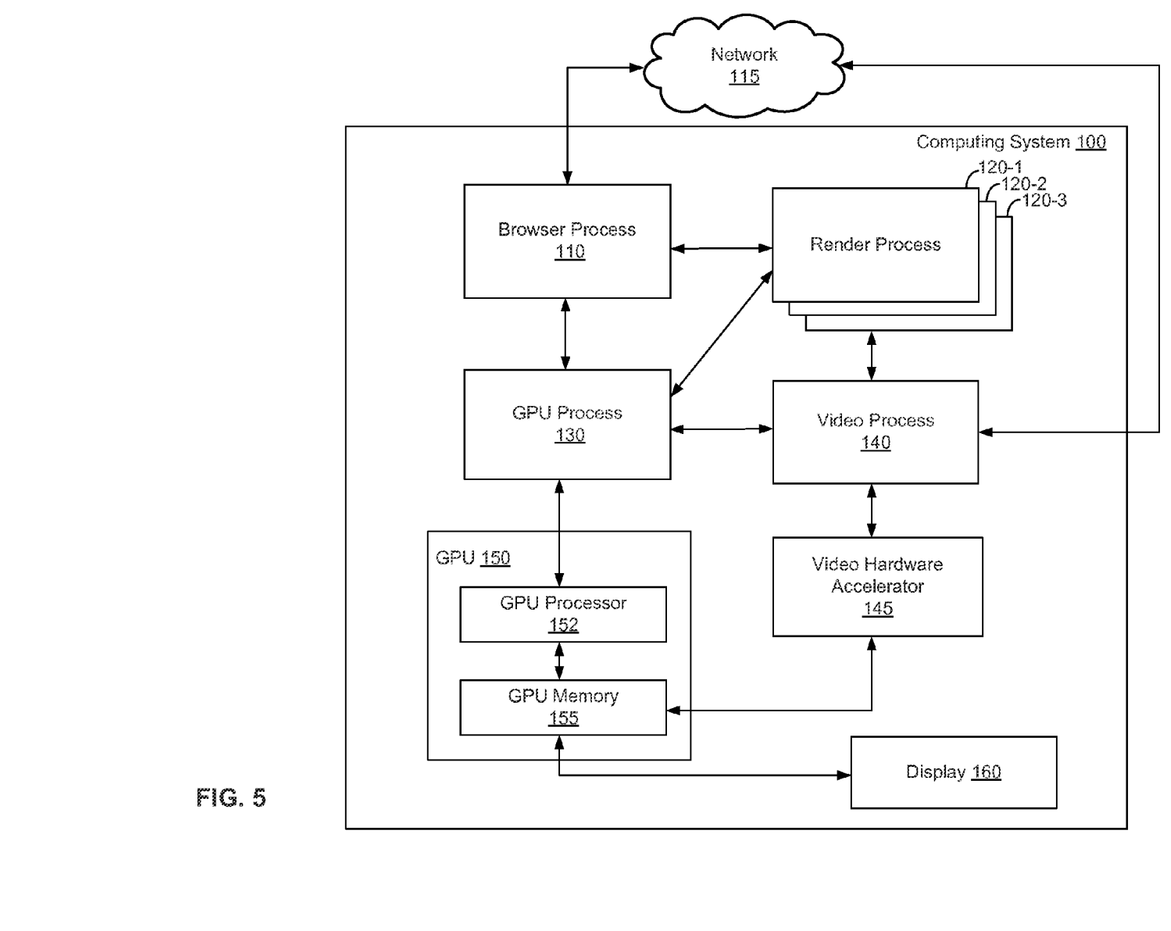
FIG. 5 is a conceptual block diagram of a computing system comprising multiple render processes according to an aspect of the subject technology.

In one aspect, the computing system 100 may include multiple render processes 120-1 to 120-3, as shown in FIG. 5. For example, the computing system 100 may include a separate render process 120-1 to 120-3 for each tab that is open on the web browser. The browser process 110 may allow the user to open multiple tabs to navigate between multiple web pages on the browser, as discussed further below.

Each render process 120-1 to 120-3 may be responsible for rendering a web page corresponding to the respective tab. The browser process 110 may trigger the creation of a new render process 120-1 to 120-3 on the computing system 100 each time a new tab is opened. The browser process 110 may do this by instructing a processor to load and execute code for implementing a render process. Thus, render processes 120-1 to 120-3 may be created as needed during a browser session. Although three render processes 120-1 to 120-3 are shown in the example in FIG. 5, it is to be appreciated that the computing system 100 may have any number of render processes.

An advantage of using multiple render processes 120-1 to 120-3 is that, if one render process crashes 120-1 to 120-3, then the other render processes may not be affected. As a result, only the tab corresponding to the crashed render process may be terminated instead of all of the tabs.

In this aspect, multiple render processes 120-1 to 120-3 may share the video process 140 for video rendering. The first render process 120-1 to 120-3 requiring video rendering may trigger the creation of the video process 140 on the computing system 100 by instructing the processor to load and execute code for implementing the video process 140. In this aspect, each render process 120-1 to 120-3 may act as a client of the video process 140, which provides video rendering services to the render processes 120-1 to 120-3.

The render proves 120-1 to 120-3 may also share the browser process 110 and the GPU process 130, as discussed further below.

In one aspect, the browser process 110 may manage the tabs based on user input. For example, the user may open a new tab by clicking on an add button within a tabs tool bar and may close a particular tab by clicking on a close button within the tab. When the user opens a new tab, the browser process 110 may trigger the creation of a new render process 120-1 to 120-3 to handle rendering of the web content for the new tab. When the user closes a tab, the browser process 110 may trigger the end of the respective render process 120-1 to 120-3 since the render process is no longer needed to render content for the tab.

A tab may be in the foreground when the corresponding web page is currently displayed to the user, and a tab may be in the background when the corresponding web page is currently not displayed to the user. The browser process 110 may allow the user to move a tab to the foreground by clicking on the tab and to move a tab to the background by clicking on another tab or opening a new tab.

The user may view video content (e.g., embedded video) associated with a tab in the foreground. While the tab is in the foreground, the respective render process 120-1 to 120-3 may instruct the video process 140 to render video content using the video hardware accelerator 145 and instruct the GPU process 130 to composite the web content rendered by the render process with the rendered video content, as discussed above.

The user may then move the tab to the background (e.g., to view another web page) by clicking on another tab or opening a new tab. When this occurs, the browser process 110 may inform the respective render process 120-1 to 120-3 that the tab has been moved to the background. The render process 120-1 to 120-3 may store the current playback position of the video content in memory and instruct the video process 140 to stop rendering the video content. In response, the video process 140 may disconnect the computing system from the source of the video content on the network 115, and store the last rendered video frame in the GPU memory 155. As discussed further below, the last rendered video frame may be stored in the GPU memory 155 as a GL texture while the tab is in the background, and may be used to provide a screenshot of the video content at the point where the user moved the tab to the background.

Thus, when the user moves the tab to the background, the video process 140 ceases rendering video content for the tab (e.g., does not play the video content in the background). By stopping rendering of the video content when the tab is moved to the background, the computing system 100 does not waste video resources rendering video content that is not visible to the user, thereby conserving power on the computing system 100.

While the tab is in the background, the video process 140 and the GPU process 130 may be allocated to other render processes 120-1 to 120-3. For example, at a given time, the video process 140 may be allocated to the render process 120-1 to 120-3 corresponding to the tab currently in the foreground. This render processor may instruct the video process 140 to render video content using the video hardware accelerator 145 and instruct the GPU process 130 to composite the web content rendered by the render process with the rendered video content, as discussed above. The last rendered video frame discussed above may be stored in an area of the GPU memory 155 reserved for video screenshots so that this frame is not overwritten with a rendered video frame for the tab currently in the foreground.

When the user moves the tab back to the foreground, the browser process 110 may inform the respective render process 120-1 to 120-3 that the tab has been moved to the foreground. When this occurs, the render process 120-1 to 120-3 may instruct the GPU process 130 to command the GPU 150 to composite a web content rendered by the render process with the last rendered video frame. As discussed above, the last rendered video frame provides a screenshot of the video content at the point where the user last moved the tab to the background. Thus, when the user moves the tab back to the foreground, the user sees a screenshot of the video content at the point where the user last moved the tab to the background.

In one aspect, the browser process 110 may allow the user to resume playback of the video content after moving the tab back to the foreground (e.g., by clinking on a play button on the respective web page). When the user resumes video playback, the browser process 110 may inform the respective render process 120-1 to 120-3 to resume video playback. In response, the render process 120-1 to 120-3 may send the video link for the video content and the playback position to the video process 140. The playback position corresponds to the point at which the video process 140 last rendered the video content.

The video process 140 may then reestablish the connection with the source of the video content using the video ink (e.g., URL) and send the playback position to the video source. The video source may then resume sending the video content (e.g., as a video stream) to the video process 140 starting from the playback position. As the video process 140 receives the video content, the video process 140 may direct the video content to the video hardware accelerator 145 for accelerated video rendering.

The render process 120-1 to 120-3 may instruct the GPU process 130 to composite the web content rendered by the render process with the rendered video content, as discussed above. Each time the video process 140 informs the render process 120-1 to 120-3 that a rendered video frame is available for compositing, the render process 120-1 to 120-3 may instruct the GPU process 130 to command the GPU 150 to composite the web content rendered by the render process with the rendered video frame.

In another aspect, the render process 120-1 to 120-3 may automatically resume playback of the video content when the user moves the tab back to the foreground. In this aspect, the render process 120-1 to 120-3 may automatically send the video link for the video content and the playback position to the video process 140 with instructions to resume rendering the video content from the playback position. The render process 120-1 to 120-3 may instruct the GPU process 130 to composite the web content rendered by the render process with the rendered video content, as discussed above.

Figure 6:
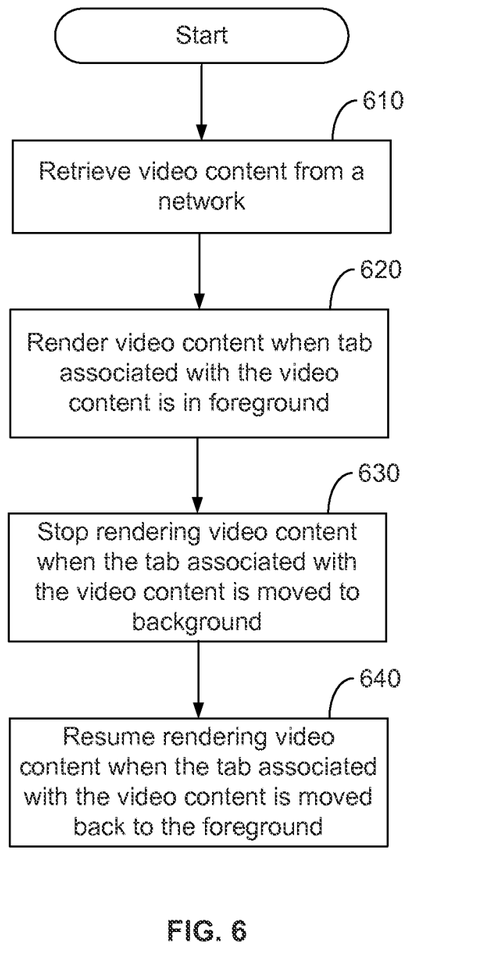
FIG. 6 shows a method for rendering video content according to yet another aspect of the subject technology.

FIG. 6 shows a method for rendering video content according to an aspect of the subject technology. The method may be performed by the render process 120, the video process 140, and the GPU process 130.

In step 610, video content is retrieved from a network. For example, the video process 140 may retrieve the video content from the network 115 using a video link (e.g., URL) provided by the render process 120, as discussed above.

In step 620, the video content is rendered when a tab associated with the video content is in the foreground. For example, the video content may be rendered by the video hardware accelerator 145 when the associated tab is in the foreground.

In step 630, rendering of the video content is stopped when the associated tab is moved to the background. For example, the video hardware accelerator 145 may ceases rendering the video content when the associated tab is moved to the background (e.g., user clicks on another tab or opens a new tab).

In step 640, rendering of the video content resumes when the associated tab is moved back to the foreground. For example, the video hardware accelerator 145 may resume rendering the video content from the point at which rendering of the video content ceased when the tab was last moved to the background.

Alternatively, a screenshot of the rendered video content may be displayed to the user, in which the screenshot corresponds to the point at which the user last moved the tab to the background. In this aspect, the user may resume rendering of the video content, e.g., by activating a play button on a video media player.

Figure 7:
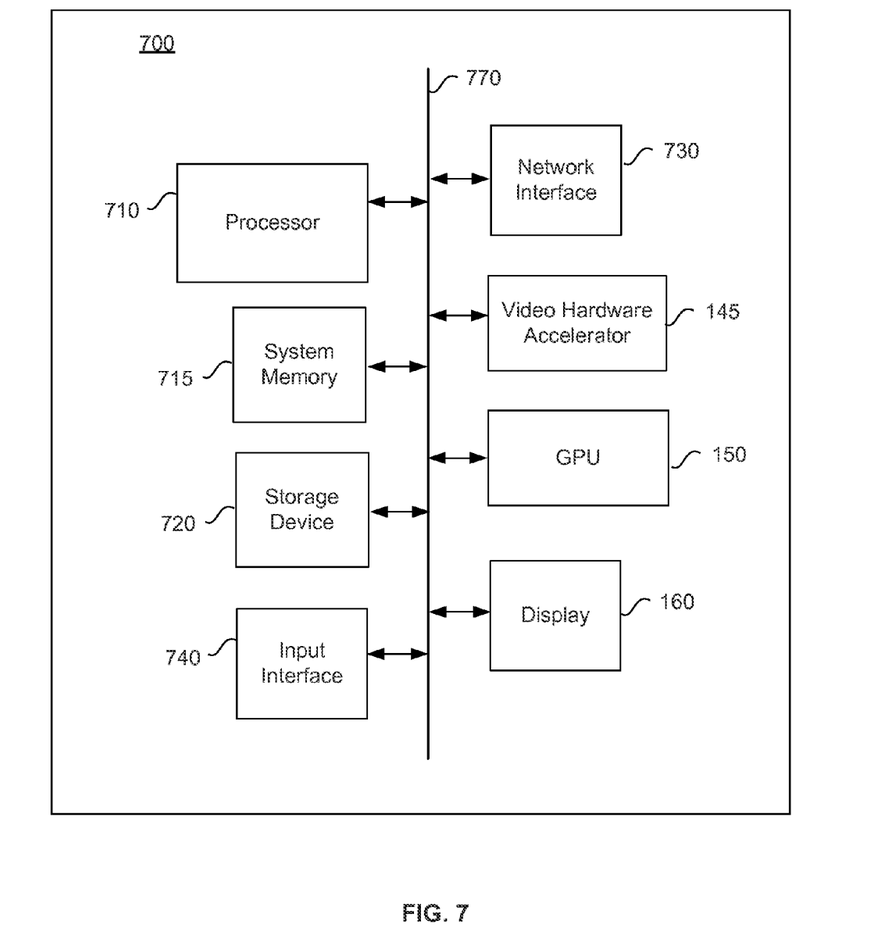
FIG. 7 conceptually illustrates an electronic system with which some implementations of the subject technology are implemented.

FIG. 7 conceptually illustrates an electronic system 700 with which some implementations of the subject technology are implemented. The electronic system 700 can be used to implement the computing system shown in FIG. 1. The electronic system 700 may be a smart phone, a tablet, a personal digital assistant, a laptop or other electronic system. While the electronic system 700 is shown in one configuration in FIG. 7, it is to be understood that the electronic system 700 may include additional, alternative and/or fewer components.

In the example shown in FIG. 7, the electronic system 700 includes a processor 710, system memory 715, a storage device 720, a network interface 730, an input interface 740, the video hardware accelerator 145, the GPU 150, the display 160, and a bus 770.

The bus 770 collectively represents all system, peripheral, and chipset buses that communicatively connect the numerous components of the electronic system 700. For instance, the bus 770 communicatively connects the processor 710 with the system memory 715 and the storage device 720. The processor 710 may retrieve instructions from one or more of these memories and execute the instructions to implement one or more of the processes according to various aspects of the subject technology. The processor 710 may comprise a single processor or a multi-core processor in different implementations.

The storage device 720 may comprise a solid state drive, a magnetic disk, or an optical drive. The storage device 720 may be used to store an operating system (OS), programs, and/or files. The system memory 715 may comprise volatile memory (e.g., a random access memory (RAM)) for storing instructions and data that the processor 710 needs at runtime.

In one aspect, the browser process 110, the render process 120, the graphics process unit (GPU) process 130, and the video process 140 may be implemented on the processor 710. For each process, the processor 710 may retrieve code corresponding to the process from a memory (e.g., system memory 715 and/or storage device 710) and execute the code to implement the process. The various processes running on the processor 710 may communicate with one another via inter-process communication (IPC). The shared memory used to share data across processes may be implemented using the system memory 715 and/or an internal memory of the processor 710.

The network interface 730 enables the processor 710 to communicate with the network 115 (e.g., a local area network (LAN), a wide area network (WAN), an intranet, the Internet, etc.). For example, the browser process 110 and the video process 140 implemented on the processor 710 may retrieve content from the network 115 via the network interface 730. The network interface 730 may include a wireless communication module for communicating with a base station or wireless access point connected to the network 115 over a wireless link (WiFi wireless link, cellular wireless link, etc.).

The input interface 740 enables the user to communicate information and commands to the processor 710. For example, the input interface 740 may be coupled to an alphanumeric keyboard and/or a pointing device (e.g., touch pad or mouse) to receive commands from the user. For example, the browser process 110 may receive inputs from the user via the input interface 740. The browser process 110 may use the received inputs to determine when the user clicks on a link and to retrieve the corresponding web page from the network 115.

Many of the above-described features and applications may be implemented as a set of machine-readable instructions stored on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this disclosure, the term "software" and "program" is meant to include firmware or applications stored in a memory, which can be executed by a processor. Also, in some implementations, multiple software aspects can be implemented as sub-parts of a larger program while remaining distinct software aspects. In some implementations, multiple software aspects can also be implemented as separate programs. Finally, any combination of separate programs that together implement a software aspect described here is within the scope of the disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a process, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more processes, sub programs, or portions of code). A computer program can be deployed to be executed on one computer or on multiple computers that are located at one site or distributed across multiple sites and interconnected by a communication network.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computers and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
   retrieving video content from a network;
   rendering the retrieved video content for display in a foreground of one or more user interfaces; and
   responsive to the display of the video content being moved from the foreground to a background of the one or more user interfaces, stopping the rendering of the video content and storing a last rendered video frame of the video content in an area of a graphics processing unit (GPU) memory that will not be overwritten with a rendered video frame displayed by a user interface in the foreground while the video content is in the background.

2. The computer-implemented method of claim 1, further comprising:
   resuming the rendering of the video content in connection with the display of the video content being moved from the background to the foreground.

3. The computer-implemented method of claim 2, further comprising:
   wherein the one or more user interfaces comprise a tabbed application, a first tab of the tabbed application providing the display of the video content, and wherein the display of the video content being moved from the foreground to the background comprises switching from the first tab to a second tab of the tabbed application.

4. The computer-implemented method of claim 3, further comprising:
   storing a current playback position of the video content when the first tab is moved from the foreground to the background, wherein resuming the rendering of the video content comprises resuming the rendering of the video content from the stored playback position.

5. The computer-implemented method of claim 3, wherein the tabbed application is a web browser.

6. The computer-implemented method of claim 5, further comprising:
   parsing markup language code of a web page to retrieve a video link, wherein the video content is retrieved from the network using the video link.

7. The computer-implemented method of claim 6, wherein the video link comprises a uniform resource locator (URL).

8. The computer-implemented method of claim 2, wherein the video content is retrieved from a video content source over the network, wherein stopping the rendering of the video content comprises disconnecting a network connection to the video content source when the video content is moved from the foreground to the background, and wherein resuming the rendering of the video content comprises reestablishing the network connection to the video content source when the video content is moved from the background to the foreground.

9. A computer-implemented method, comprising:
   retrieving video content from a network;
   rendering the retrieved video content for a display of the video content in an application foreground;
   in response to the display of the video content being moved from the application foreground to an application background, stopping the rendering of the retrieved video content and storing a last rendered video frame of the rendered video content in an area of a graphics processing unit (GPU) memory that will not be overwritten with a rendered video frame displayed by a user interface in the application foreground while the video content is in the application background; and
   providing for display, based on the display of the video content being returned from the application background to the application foreground, the stored last rendered video frame of the rendered video content in the application foreground.

10. The computer-implemented method of claim 9, wherein the display of the video content is on a first tabbed page in a web browser, and wherein moving the display of the video content from the application foreground to an application background comprises switching between the first tabbed page and a second tabbed page in the web browser.

11. The computer-implemented method of claim 10, further comprising:
    parsing markup language code of a web page to retrieve a video link, wherein the video content is retrieved from the network using the video link.

12. The computer-implemented method of claim 9, further comprising:
    receiving, while the stored last rendered video frame is displayed, a user input to resume playback of the video content; and
    resuming, based on the user input, the rendering of the video content from a point at which the rendering stopped.

13. The computer-implemented method of claim 9, further comprising:
    compositing the stored last rendered video frame of the rendered video content with rendered web content when the display of the video content is moved from the application background to the application foreground.

14. The computer-implemented method of claim 9, wherein the video content is retrieved from a video content source over the network, and stopping the rendering of the video content comprises disconnecting a network connection to the video content source when the video content is moved from the foreground to the background, the method further comprising:
when the display of the video content is returned from application background to the application foreground, reestablishing the network connection to the video content source while the stored last rendered video frame is provided for display in the application foreground.

15. A system, comprising:
one or more processors; and
a memory having instructions stored thereon that, when executed by the one or more processors, cause the one or more processors to:
retrieve video content from a network;
render the retrieved video content when a display of the video content is in an application foreground of an application; and
in response to the display of the video content being moved from the application foreground to an application background, stop rendering of the video content and store a last rendered video frame of the rendered video content in an area of a graphics processing unit (GPU) memory that will not be overwritten with a rendered video frame displayed by a user interface in the application foreground while the video content is in the application background.

16. The system of claim 15, wherein the instructions, when executed, further cause the one or more processors to: resume the rendering of the video content when the display of the video content is returned from the application background to the application foreground.

17. The system of claim 15, wherein the instructions, when executed, further cause the one or more processors to:
composite the last rendered video frame with rendered web content when the display of the video content is returned from the application background to the application foreground.

18. The system of claim 15, wherein the display of the video content is on a first tabbed page in a web browser, and wherein moving the display of the video content from the application foreground to an application background comprises switching between the first tabbed page and a second tabbed page in the web browser.

19. The system of claim 15, wherein the video content is retrieved from a video content source over the network, wherein stopping the rendering of the video content comprises disconnecting a network connection to the video content source when the video content is moved from the foreground to the background, and wherein resuming the rendering of the video content comprises reestablishing the network connection to the video content source when the video content is moved from the background to the foreground.

20. The system of claim 15, wherein the last rendered video frame is stored in the GPU memory as a graphics texture while the video content is in the background.

* * * * *